March 6, 1928.

G. CARPENTER

ZERO CORRECTOR

Filed Nov. 6, 1926

Inventor:
Grant Carpenter,
By Byrnes, Townsend & Brickenstein,
Attorneys.

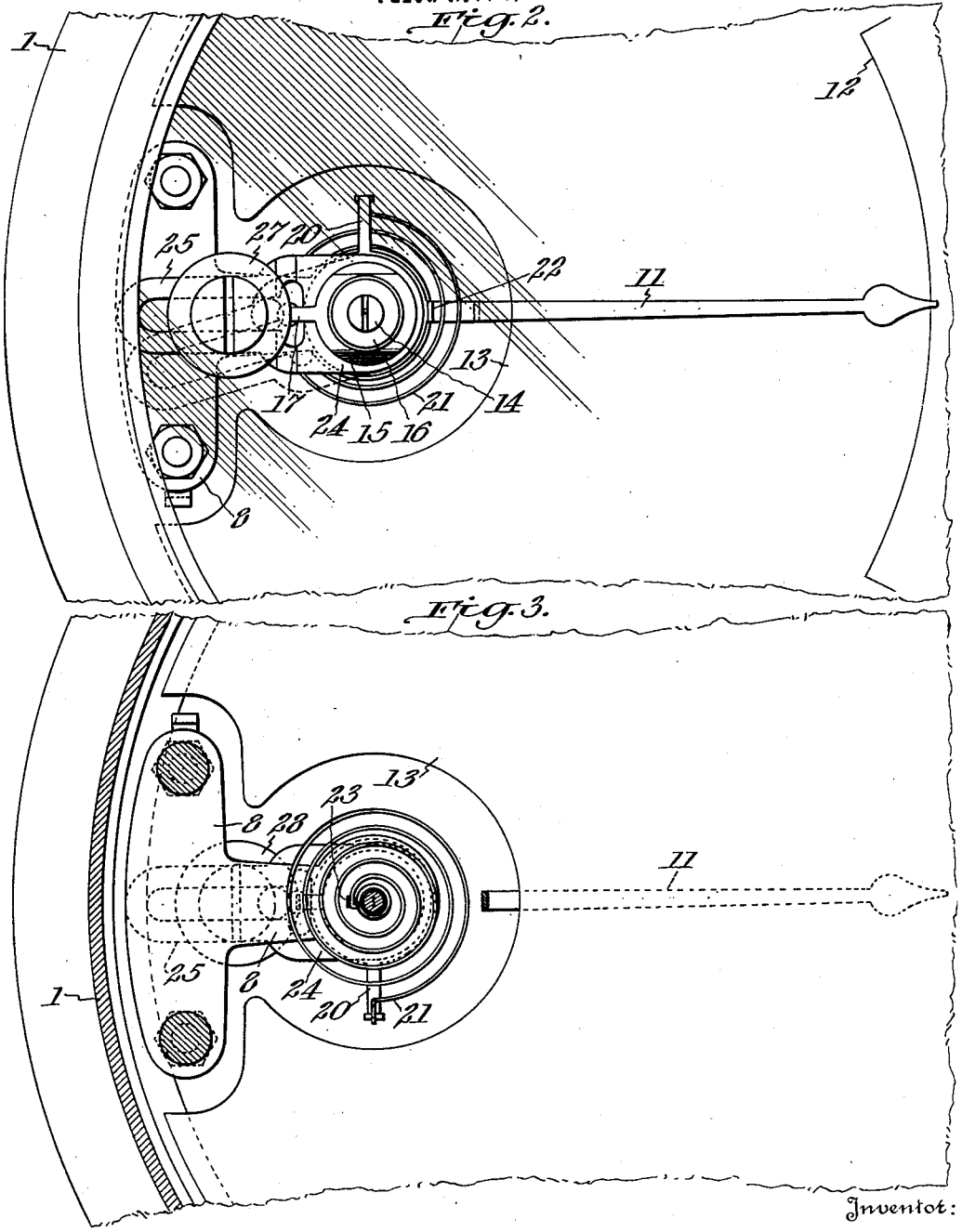

Patented Mar. 6, 1928.

1,661,214

UNITED STATES PATENT OFFICE.

GRANT CARPENTER, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

ZERO CORRECTOR.

Application filed November 6, 1926. Serial No. 146,766.

This invention relates to a zero corrector for indicating instruments and particularly to a construction which may be embodied in instruments having single springs, or having non-adjustable bottom springs.

A common type of zero corrector consists of an eccentrically mounted corrector pin which projects through a portion of the abutment or plate to which the spiral spring is connected. The angular position of the spring abutment and therefore of the spring and instrument pointer, may be adjusted by turning the corrector pin. Such constructions are satisfactory when the instrument is provided with a bottom spring which may be adjusted to place the upper spring abutment and pointer in such relationship to the eccentric pin that the latter can displace the pointer through substantially equal distances on opposite sides of the scale zero. This construction is not satisfactory, however, when the instrument has only a single spring, or has a non-adjustable bottom spring. Zero correctors for such instruments have consisted of a corrector plate which was adjustably clamped to the abutment plate and which had a slotted tail for receiving the eccentric pin. The corrector plate and spring abutment were usually clamped together by a screw and slot construction at the completion of the factory adjustment of the parts. This connection of the parts becomes more and more difficult with a decrease in the size of the instruments, and is impractical with the smaller instruments of precision.

An object of the invention is to provide a simple and readily assembled zero corrector for use with instruments having a single spring, or having a single adjustable spring. An object is to provide a zero corrector which does not require a positive connection between the corrector plate and the spring abutment. More specifically, an object is to provide a zero corrector which may be applied to an instrument bearing without requiring changes in the construction of the bearing.

These and other objects of the invention will be apparent from the following specification when taken with the accompanying drawings, in which Fig. 1 is a fragmentary vertical section through an instrument in which the invention is embodied;

Fig. 2 is a fragmentary plan view;

Fig. 3 is a broken section as taken on line 3—3 of Fig. 1, and looking in the direction of the arrows.

Figure 1:
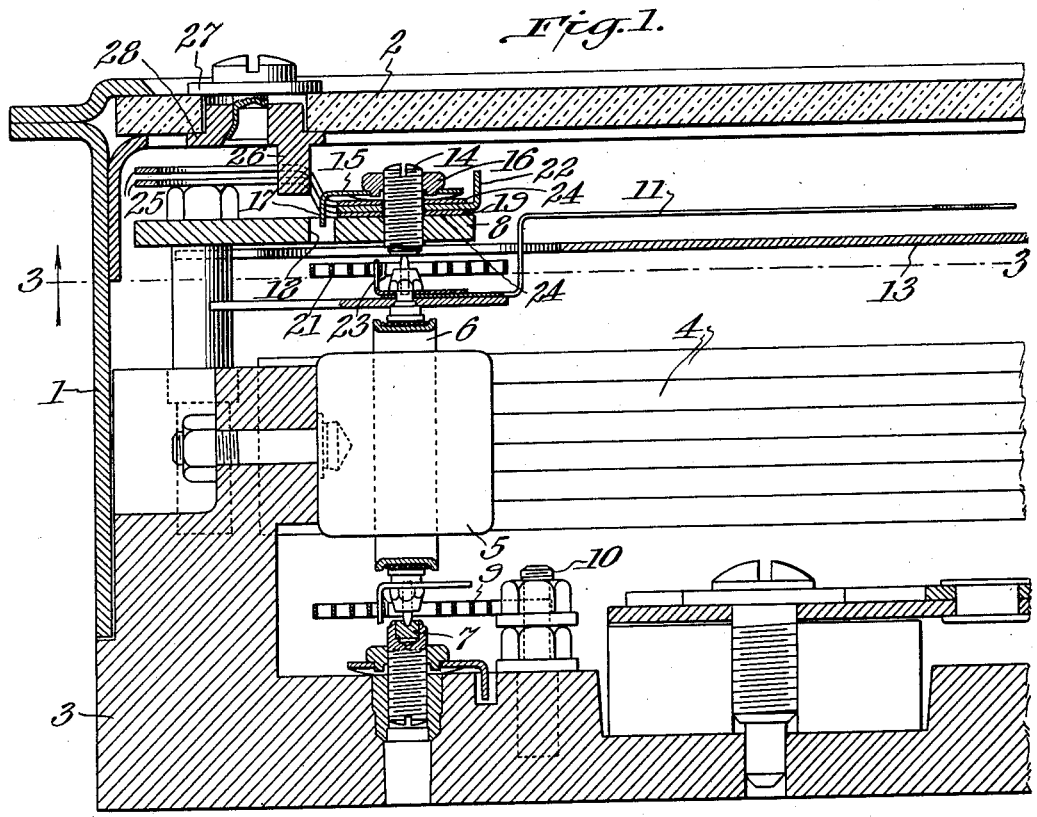

In the drawings, the numeral 1 indicates the metal shell which cooperates with the glass 2 and base 3 to form a housing for the instrument. The magnets 4 and the stationary winding 5 are mounted directly upon the base 3 which is formed of insulating material such as a synthetic resin. The movable element 6 is carried by a lower bearing 7 fixed in the base 3 and an upper bearing fixed in a bridge 8 which is secured to and spaced from the base. The outer end of the lower spring 9 is secured to the post 10 which is fixed to the base 3. The upper end of the movable element 6 is provided with an indicating pointer 11 which cooperates with a scale 12 on the plate 13.

The upper bearing is preferably of the type described in the patent to Weston, No. 1,592,020, and comprises a pivot pin 14 which is threaded through the bridge 8 and is locked in position by a spring washer 15 and nut 16. The washer and nut have interengaging parts which prevent their relative rotation and the washer carries an extension 17 which projects into an opening 18 in the bridge. The spring abutment 19 has an extension 20 to which the outer end of the upper spring 21 is secured, and is provided with an upstanding arm or handle 22. The inner end of spring 21 is fixed to the movable element 6 by the split lug 23.

As illustrated in the above-mentioned patent, the spring abutment rested upon the bridge and was pressed against the same by the spring washer. Adjustment of the abutment, and thereby of the pointer, was effected by means of the upstanding arm 22, the turning movement being opposed by the frictional resistance due to the pressure of the spring washer. In accordance with the present invention, corrector plates 24 are arranged at opposite sides of the spring abutment 19, and these plates have slotted extensions 25 through which passes the eccentrically-mounted pin 26 of the zero corrector. The corrector is formed in two parts having flanges for securing the same within an opening in the glass 2, the upper portion 27 having a kerf for the reception of a screwdriver, and the lower portion 28 being integral with the pin 26. The upper part 27 terminates in a sleeve which is expanded into engagement with a tapered recess in the member 28 to lock the parts to each other.

The slots in the extensions 25 of the corrector plates are of sufficient width to clear the extension 17 of the spring washer which passes through the same and into the bridge.

In the assembly of the upper bearing, the nut 16, spring washer 15, spring abutment 19, corrector plates 24 and bridge 8 are arranged in their proper relative positions in a fixture or forming device which compresses the spring washer 15 to the desired amount. While the parts are in this position, the screw 14 is inserted by simply screwing it down through the nut and bridge piece, the assembling fixture being constructed to permit such slight adjustment as may be required to allow the screw to pick up the thread of the bridge.

Figure 4:
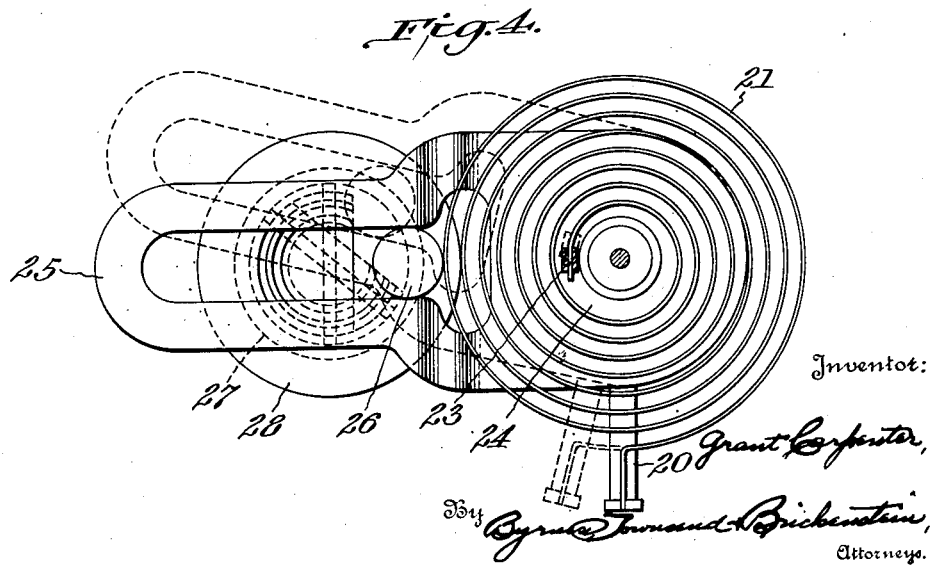
Fig. 4 is an enlarged view of the adjuster elements and spring, as seen from the interior of the instrument housing.

When the parts are assembled on the base 3, an initial or factory adjustment of the zero corrector parts may be necessary to place the extensions 25 of the corrector plates in vertical alinement, and in the central position of their range of adjustment when the pointer 11 is approximately at its zero position. This adjustment is made by holding the extensions 25 in the desired position and turning the spring abutment by means of the handle 22. During this adjustment, the frictional resistance to relative movement of the abutment and the corrector plates must be overcome and therefore the pressure of the spring washer must be so chosen that this action is possible without damage to the abutment and plates. By then placing the pin 26 at the center of its range of lateral displacement, and so applying the glass cover that the pin 26 passes through the slots of the corrector plates, the parts of the zero adjuster will be in such position that substantially equal displacements of the pointer toward opposite sides of its zero position may be effected. Due to the frictional engagement of the corrector plates and the spring abutment, these parts preserve their initial angular adjustment and turn as a unit when the corrector plates are moved by the pin 26. In Fig. 4, the dotted lines show the angular displacement of the spring (and therefore of the pointer) which results from an angular displacement of the corrector plates.

It is to be noted that the initial adjustment of the parts to proper angular position does not require a positive or mechanical connection. The invention is therefore of especial utility in connection with instruments in which the parts are of such small size that it would be difficult or impractical to provide a positive mechanical adjustment between the spring abutment and the corrector plates. In practice, the invention has been employed with instruments in which the spring abutment 19 has a thickness of the order of one one-hundredth of an inch.

It is to be understood, however, that the invention is not limited in its application to any particular size of instruments and instrument parts, or to instruments of the specific construction shown in the accompanying drawings. The relative size, shape and arrangement of the several elements of the zero corrector are subject to wide variation without departure from the spirit of my invention as set forth in the following claims.

I claim:

1. A zero adjuster comprising a spring abutment, a corrector plate at each side of said abutment and in surface contact therewith, means pressing said plate and abutment into frictional engagement to prevent relative angular movement thereof, extensions on said corrector plates, and an eccentric cooperating with said extensions for adjusting said plates.

2. A zero corrector of the type including a spring abutment, an eccentric, and means operable by said eccentric for adjusting the angular position of said abutment, characterized by the fact that said means includes a plate at each side of said abutment and spring means pressing said plates into frictional engagement with said abutment to prevent relative angular movement thereof, said plates having aligned and slotted extensions for receiving said eccentric.

3. A zero adjuster for an indicating instrument comprising a bridge, a pivot screw thereon for supporting one end of a rotatable element, a spring abutment on said bridge and adapted to be angularly adjusted about said pivot screw, a plate at each side of and in surface contact with said abutment, means holding said plates in frictional engagement with said abutment to prevent relative angular movement thereof, and means for moving said plate about said pivot screw as an axis.

4. A zero adjuster for an instrument bearing of the type including a bridge, a pivot pin carried thereby, a spring abutment angularly adjustable about said pivot pin, and yielding means pressing said abutment toward said bridge, said adjuster comprising a corrector plate at each side of and in surface contact with said spring abutment, extensions on each of said plates, and eccentric means for adjusting said plates about said pivot pin.

In testimony whereof, I affix my signature.

GRANT CARPENTER.